US012705529B1

(12) United States Patent
Tseng

(10) Patent No.: US 12,705,529 B1
(45) Date of Patent: Aug. 11, 2026

(54) MACHINE LEARNING BASED CLASSIFICATION SEGMENTATION FOR LARGE CLASS SETS

(71) Applicant: Amazon Technologies, Inc., Seattle, WA (US)

(72) Inventor: Kevin Kuang-Hui Tseng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1043 days.

(21) Appl. No.: 17/378,382

(22) Filed: Jul. 16, 2021

(51) Int. Cl.
*G06N 20/00* (2019.01)
*G06N 5/01* (2023.01)

(52) U.S. Cl.
CPC ............... *G06N 20/00* (2019.01); *G06N 5/01* (2023.01)

(58) Field of Classification Search
CPC ................................ G06N 20/00; G06N 5/01
See application file for complete search history.

(56) References Cited

U.S. PATENT DOCUMENTS

2019/0102345 A1* 4/2019 Singaraju .............. G10L 15/063
2021/0109969 A1* 4/2021 Oliveira Almeida ........................ G06F 16/906
2021/0264036 A1* 8/2021 Gitelman .............. G06F 21/577
2021/0357679 A1* 11/2021 Bondugula ............ G06N 3/082
2022/0004887 A1* 1/2022 Spratt ..................... H04L 41/16
2023/0316144 A1* 10/2023 Bose ........................ G06N 5/01 706/12

* cited by examiner

*Primary Examiner* — Markus A. Vasquez
(74) *Attorney, Agent, or Firm* — Knobbe, Martens, Olson & Bear, LLP

(57) ABSTRACT

A classification system is provided for efficient machine-learning-based classification using a large set of possible classes (e.g., millions or hundreds of millions of distinct classes). A two-step process may be used whereby the large set of classes is segmented into reasonably-sized segments, and a separate classification model is generated for each of the different segments of classes.

20 Claims, 5 Drawing Sheets

MACHINE LEARNING BASED CLASSIFICATION SEGMENTATION FOR LARGE CLASS SETS

BACKGROUND

Models representing data relationships and patterns, such as functions, algorithms, systems, and the like, may accept input, and produce output that corresponds to the input in some way. For example, an input may represent a data entity and include various features of the data entity. A model may be trained to classify data entities into one of multiple classes based on a set of training data that includes inputs and corresponding classes to which the training data input vectors are to classified.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
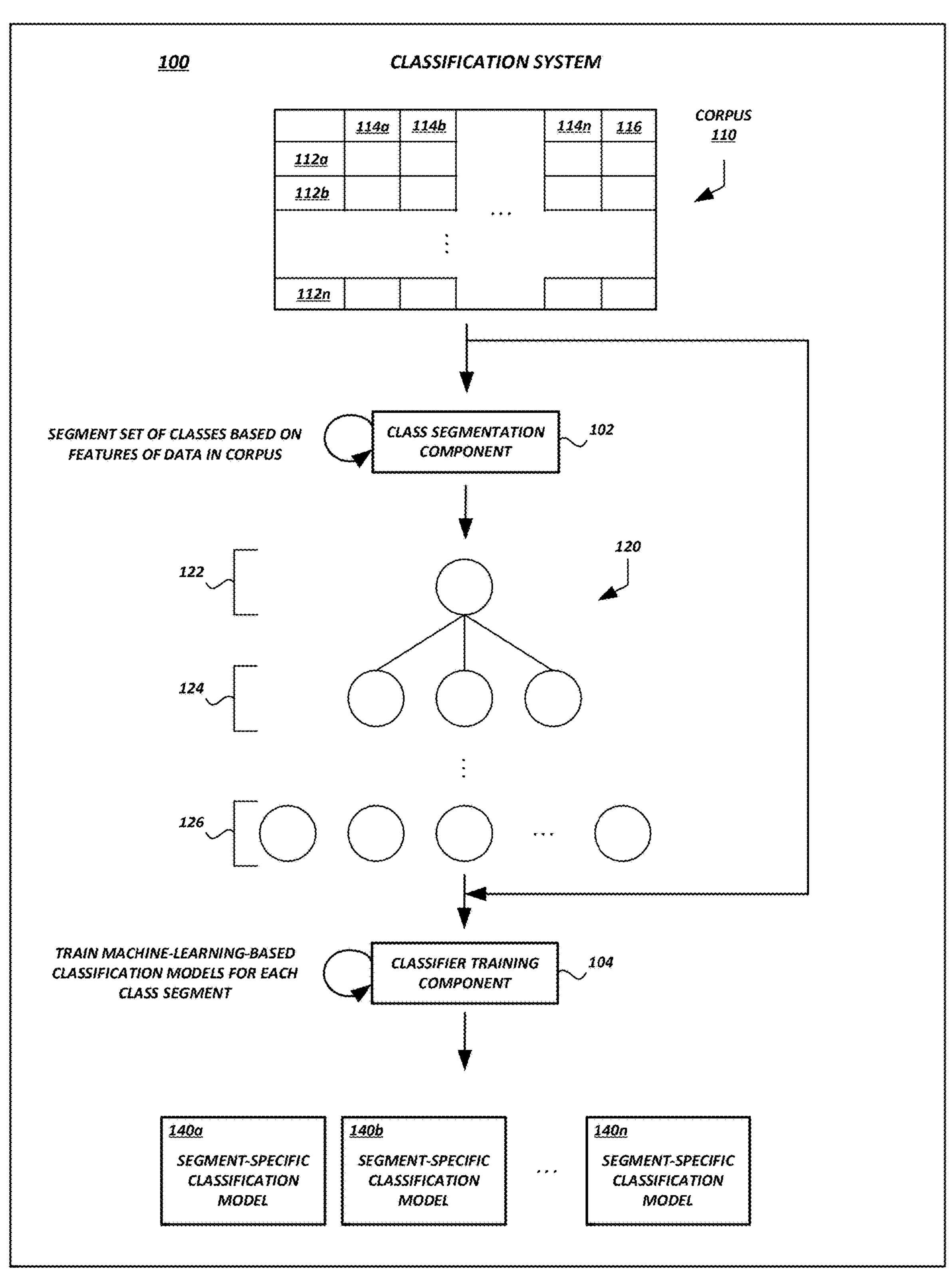
FIG. 1 is a diagram showing a classification system that generates a map of data entities and classes to segments of classes, and then trains machine-learning-based classifiers for individual class segments according to some embodiments.

The present disclosure is directed to a system for classification of data entities into any of a large number of classes, including sets of hundreds of thousands, millions, or hundreds of millions of distinct classes.

Conventional machine learning classifiers are accurate, efficient, and robust for small numbers of distinct classes, such as binary classification in which a data entity is classified into one of two possible classes. However, as the number of possible distinct classes increases, classification accuracy declines. Moreover, with large numbers of possible distinct classes, the complexity of the conventional machine learning-based classification algorithms renders solving the classification problem—at training time and/or at prediction time—impractical and potentially impossible with available computational resources. For example, if data entities are to be classified into one of 500,000,000+ distinct classes, conventional machine learning classification algorithms cannot be used.

Some aspects of the present disclosure address the issues noted above, among others, through segmentation of large class sets into segments of smaller quantities of classes. In some embodiments, a large set of classes may be segmented into segments of smaller quantities of classes based on the features of the data entities to be classified. A data entity may be associated with any number of features, and each feature may take any number of values. Some features may take any of a set of discrete values, other features may take any of a range of continuous values, and still other features may take any of an unbounded set of values. The large set of classes may be segmented based on feature values or combinations of feature values with which data entities in the classes are expected to be associated. The particular features used to perform the segmentation, and the individual feature values or combinations thereof, may be chosen such that the large class set is segmented into smaller segments each having a desirable number of classes, such as segments expected to have less than a threshold quantity of classes.

For example, a session data entity representing a browsing session may include separate features for the device being used in the session, software used in the session, network address of the device, date/time of the session, interactions during the session, etc. It may be desired to classify the session data entity as likely being a session of a particular user of a system (e.g., one of potentially millions of different users). When a classification system is being configured to classify such session data entities, the features of the session data entities may serve as the basis upon which to segment the large set of classes (one class for each of the millions of different users) into smaller segments for training.

In some embodiments, a representative set of data entities for each of the individual classes may be used to segment the classes. For example, a first set of representative data entities may be labeled with a first class into which the classification system is to classify them, a second set of representative data entities may be labeled with a second class, and so on. The composite set of labeled training data entities may be segmented into a first grouping based on a value of a first feature (e.g., if there are 100 possible discrete values for the first feature, the data entities may be grouped into 100 different groups). The initial groups of training data entities may be further segmented into smaller groups based on additional features, as needed, until the segments of data entities each have a desirable quantity of classes.

Segmenting the classes based on feature values or combinations thereof may be implemented using a data structure, such as a tree structure or graph structure. In embodiments using a tree structure, the root node may include every class in the large set of classes. A first tier of classes below the root may be used to perform an initial segmentation of the classes based on a feature value. For example, the first tier of classes may include 100 nodes if there are 100 possible discrete values of a feature being used to perform the initial segmentation. Additional tiers may be added below any or all of the nodes, some or all of which may or may not be based on the same features as other tiers and nodes, until the leaf nodes each include a desirable quantity of classes (e.g., between a minimum and maximum threshold, such as between 200 and 2,000). In embodiments using a graph structure, such as a directed graph, vertices may represent segments of classes with one or more similar features, and edges may represent further refinement of the segments with more narrow ranges of feature values, additional features, etc. Thus, the classes may not necessarily be segmented in a hierarchical manner (as may be the case when using a tree structure), but instead there may be additional relationships between segments of classes as represented by edges of the graph structure.

Additional aspects of the present disclosure relate to training machine learning based classifiers for each of the class segments. Once the large set of classes has been segmented into desirably-sized segments, a classifier for each of the segments can be trained. Advantageously, training a classifier for a segment of the classes may provide greater accuracy and be completed in a more efficient manner than training a classifier for larger segments of the classes or for the entire large set of classes (if training such a classifier is possible). In some embodiments, training of the classifiers for the individual segments may be distributed among multiple processors or computing devices. For example, the classifiers may be trained in parallel, with each classifier being trained on a different processor. Thus, training of the entire set of classifiers may take no longer than training a single classifier. As another example, a pool of processors may be employed train the classifiers asynchronously, with each processor training a remaining classifier once training of a prior classifier has completed.

Further aspects of the present disclosure relate to using metrics during training that will optimize for the particular classification task. In some embodiments, the goal of the classification system is to determine, for a given data entity, a single correct classification out of a very large set of possible classifications. To measure this accuracy and optimize training, metrics directed specifically to that classification task can be used, such as a ranking metric that is a weighted probability or other score. For example, a ranking index can be determined to weight the probabilities or other scores according to the ranking of the correct classification. The ranking index may be the inverse of the rank of the correct classification. If a classifier produces a ranked N-best list of classes, and the correct class for a given data entity is in the third position on the N-best list, then the ranking index may be calculated as 1/3. If the probability or other score generated by the classifier for the correct class is 0.1, then the ranking metric may be calculated as 1/3*0.1=0.03333. Training of the classifier may be performed by optimizing the ranking metric. The ranking metric is for one single data point in the validation or testing dataset. In some embodiments, the overall classifier performance with respect to a validation dataset with multiple data points may be determined using a macro averaged ranking metric by taking the mean value of ranking metrics over all data points.

Various aspects of the disclosure will now be described with regard to certain examples and embodiments, which are intended to illustrate but not limit the disclosure. Although aspects of some embodiments described in the disclosure will focus, for the purpose of illustration, on particular examples of data entities, features, clustering algorithms, and classification algorithms and models, the examples are illustrative only and are not intended to be limiting. In some embodiments, the techniques described herein may be applied to additional or alternative data entities, features, clustering algorithms, and classification algorithms and models.

Example Segregation of Classes

With reference to an illustrative embodiment, FIG. 1 shows a classification system 100 that may be used to segment a large set of classes and generate classifiers for the individual segments. Collectively, the classifiers may provide classification for the large set of classes.

As shown, the classification system 100 includes a class segmentation component 102, also referred to as a class segmentation subsystem, to segment the large set of classes. The classification system 100 may also include a classifier training component 104, also referred to as a classifier training subsystem, to train classification models for individual segments of classes.

The classification system 100 (or individual components thereof, such as the class segmentation component 102 and/or classifier training component 104) may be implemented on one or more physical server computing devices. In some embodiments, the classification system 100 (or individual components thereof) may be implemented on one or more host devices, such as blade servers, midrange computing devices, mainframe computers, desktop computers, or any other computing device configured to provide computing services and resources. For example, a single host device may execute one or more class segmentation components 102, classifier training components 104, other components, or some combination thereof. The classification system 100 may include any number of such hosts.

In some embodiments, the features and services provided by the classification system 100 may be implemented as web services consumable via one or more communication networks. In further embodiments, the classification system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The class segmentation component 102 can determine segments of classes from a large set of possible classes into which the classification system 100 is to be configured to classify data entities. The set of possible classes may be large in the sense that it is inefficient or impractical to train a single classifier using conventional machine learning methods. In some embodiments, the set of classes may have greater than approximately 100,000 distinct classes, greater than approximately 1,000,000 distinct classes, greater than approximately 10,000,000 distinct classes, greater than approximately 100,000,000 distinct classes, greater than approximately 500,000,000 distinct classes, or greater than approximately 1,000,000,000 distinct classes.

The class segmentation component 102 may obtain a corpus 110 of data entities to use in determining segments of classes. The corpus 110 may include any number of individual data entities 112_a_, 112_b_, . . . , 112_n_. Each data entity may include feature data for any number of features 114_a_, 114_b_, . . . , 114_n_. Although the corpus is shown as a table with data entities 112_a_, 112_b_, . . . , 112_n_ as rows and features 114_a_, 114_b_, . . . , 114_n_ as columns, the example corpus 110 is illustrative only and is not intended to be limiting. In some embodiments, the corpus may be structured in other ways, may have a different number of features, and/or may have a different number of data entities.

Figure 2:
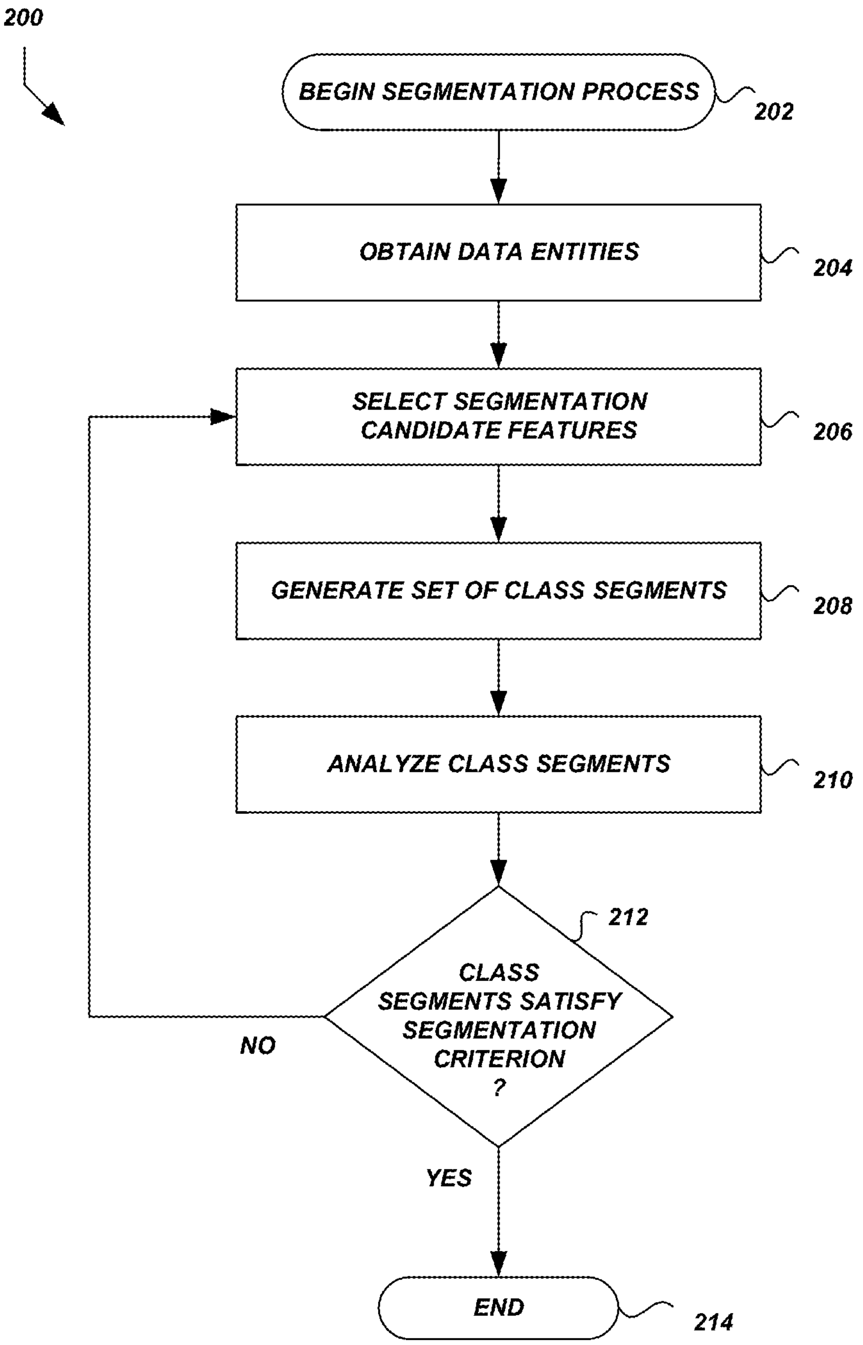
FIG. 2 is a flow diagram of an illustrative process for selecting features to be used in segmenting a set of classes and generating class segments according to some embodiments.

The class segmentation component 102 may analyze the data entities and features to select one or more features for use in segmenting classes. The classes to be segmented, and the nature of the features and data entities, may affect the particular features used to segment classes. Some features may be "slow moving" features that tend not to change from data entity to data entity for a particular class. Other features may be "fast moving" features that tend to be noisier and may change from data entity to data entity for a particular class. In a process of selecting features that are candidates for segmentation, the class segmentation component 102 may select or favor slow moving features over fast moving features. An example process for selecting features and segmenting classes based on the selected features is shown in FIG. 2 and described in greater detail below.

In some embodiments, segmenting the classes may be conceptualized or implemented using a data structure, such as a graph structure or a tree structure. FIG. 1 illustrates use of a tree structure 120. The root node 122 may include every class in the large set of classes. A first tier 124 of classes below the root may be used to perform an initial segmentation of the classes based on one or more features. For example, the first tier of classes may include 100 nodes if there are 100 possible discrete values of a feature being used to perform the initial segmentation. Additional tiers may be added below any or all of the nodes, some or all of which may or may not be based on the same features as other tiers and nodes, until the leaf nodes 126 each include a desirable quantity of classes (e.g., between a minimum and maximum threshold, such as between 200 and 2,000). The leaf nodes 126 may therefore represent the class segments.

Figure 3:
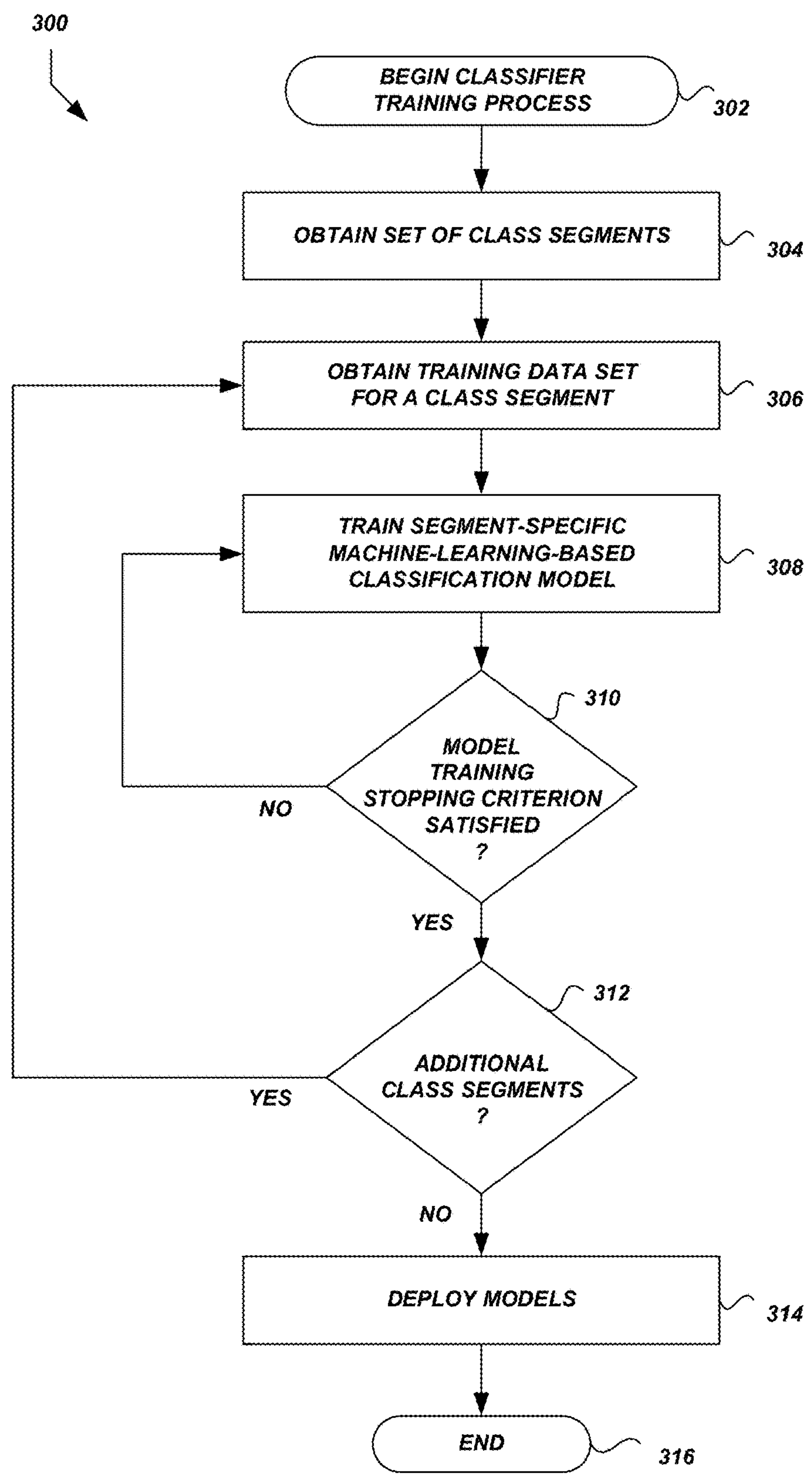
FIG. 3 is a flow diagram of an illustrative process for training machine learning models for individual class segments according to some embodiments.

The classifier training component 104 may train machine-learning-based classifiers 140*a*, 140*b*, . . . , 140*n* for each of the class segments, or for a subset thereof. For example, the classifier training component 104 may obtain one or more representative data entities for each of the classes in the set of classes. For each class segment, the classifier training component 104 may use representative data entities for the classes in the class segment to train a machine-learning-based classifier to classify data entities into the various classes of the class segment. In some embodiments, a separate validation set of representative data entities for each class in the set of classes, or subsets thereof, may be used to test the trained machine-learning-based classifiers. An example process for training machine-learning-based classifiers for the individual class segments is shown in FIG. 3 and described in greater detail below.

Example Process for Segmenting Classes

FIG. 2 illustrates an example, process 200 that the class segmentation component 102 may use to segment a large set of classes into segments of a desirable size based on features of data entities to be classified.

The process 200 begins at block 202. The process 200 may begin in response to an event, such as when the class segmentation component 102 begins operation, when the classification system 100 receives or issues a command to segment a set of classes, or in response to some other event. When the process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the class segmentation component 102 shown in FIG. 4 and described in greater detail below. In some embodiments, the process 200 or portions thereof may be implemented on multiple processors, serially or in parallel.

At block 204, the class segmentation component 102 can obtain data entities for use in the segmentation process. In some embodiments, the class segmentation component 102 may obtain a corpus 110 of data entities that are representative of each class to be segmented, or a subset thereof. For example, the data entities 112*a*, 112*b*, . . . , 112*n* in corpus 110 include features 114*a*, 114*b*, . . . , 114*n*. The data entities may also include a label 116 indicative of the proper class into which each data entity is to be classified.

In one specific, non-limiting embodiment, the data entities may represent network content browsing sessions of users. For example, the features of a session data entity may include a device type identifier, an operating system identifier, a browser identifier, an IP address, a timestamp, and other information associated with an individual browsing session. In this example, the classes that the classification system 100 is to determine for the data entities may be the individual users, where each user is a distinct class and the set of all classes to be segmented corresponds to the set of all users. The classification system 100 may implement the features and execute the processes described herein to predict a user from the set of all users when presented with a new browse session data entity.

In another specific, non-limiting embodiment, the data entities may represent documents, such as web pages or other network content items. For example, the features of a document data entity may include words of the document, a subject of the document, a source of the document, a timestamp of the document, and other information associated with an individual document. In this example, the classes that the classification system 100 is to determine for the data entities may be the individual documents, where each document is a distinct class and the set of all classes to be segmented corresponds to the set of all documents. The classification system 100 may implement the features and execute the processes described herein to predict, for a search request (e.g., a keyword in the context of a browsing session), a particular document that is being searched or requested from the set of all documents.

In another specific, non-limiting embodiment, the data entities may represent products or other items, such as products for sale in a digital marketplace. For example, the features of a product data entity may include words in a title or description of the product, a type of the product, a size of the product, a vendor of the product, and other information associated with an individual product. In this example, the classes that the classification system 100 is to determine for the data entities may be the individual products, where each product is a distinct class and the set of all classes to be segmented corresponds to the set of all products. The classification system 100 may implement the features and execute the processes described herein to predict, for a product search request (e.g., a keyword in the context of a product browsing session), a particular product that is being searched or requested from the set of all documents. As another example, the classification system 100 may predict a particular product to recommend to a user.

In another specific, non-limiting embodiment, the data entities may represent images, such images of users. In this example, the classes that the classification system 100 is to determine for the data entities may be the individual images, where each image is a distinct class and the set of all classes to be segmented corresponds to the set of all images.

In another specific, non-limiting embodiment, the data entities may represent words, such words spoken in utterances by users. In this example, the classes that the classification system 100 is to determine for the data entities may be the individual words, where each word is a distinct class and the set of all classes to be segmented corresponds to the set of all words in a language.

The example implementations described herein are illustrative only, and are not intended to be limiting, required, or exhaustive.

At block 206, the class segmentation component 102 can select features that are candidates for segmentation of the set of classes. Such features may be referred to as segmentation candidate features. To select segmentation candidate features, the class segmentation component 102 may evaluate the features of the data entities in the corpus to identify those that are slow moving features. In some embodiments, the class segmentation component 102 may evaluate features of data entities labeled in a particular class and determine which features tend to remain constant or otherwise show a low degree of variability from data entity to data entity within the class. Such features may be added to a list of segmentation candidate features. In some embodiments, features may be excluded from the list of segmentation candidate features even if they are slow moving features. For example, some features may include restricted data, such as data that is prohibited from use due to a privacy policy. Such features can be excluded from consideration accordingly.

At block 208, the class segmentation component 102 can generate a group of segments based on the segmentation candidate features. In some embodiments, a training data set may be generated to include a single representative data entity for each class, and a validation data set may be generated to include a different representative data entity for each class. To segment the classes, the class segmentation component 102 may use a clustering algorithm to generate the group of segments from the training data set. For example, to generate data entity clusters, the class segmentation component 102 can use k-means clustering, mini batch k-means clustering, or some other clustering algorithm.

In some embodiments, the problem of generating an optimum segmentation of classes may be represented as:

$$\text{Segmentation} = \min_{G_k \subset P_k} Obj(G_s) \tag{1}$$

where the segmentation candidate features are defined as $F_s=\{F_{s1}, F_{s2}, \ldots, F_{sn}\}$, where a subset of the segmentation candidate features are defined as $G_s=\{G_{s1}, G_{s2}, \ldots, G_{sm}\}$. In this embodiment, the optimization is based on minimizing the objective function $Obj(G_s)$, which can take the following form:

$$Obj(G_s) = \sum_{i=1}^{n_{seg}} (N_{s_i} - M)^2 \tag{2}$$

In equation (2), the objective function is based on the assumption that the ideal number of classes in one final segment is M and the number of classes in the ith segment is $N_{si}$. The optimization process attempts to segment the set of all classes into $n_{seg}$ final segments. Equations (1) and (2) can be solved using non-linear optimization algorithms, such as the gradient descent algorithm.

At block 210, the class segmentation component 102 can analyze the segments generated in block 208. In some embodiments, analyzing the segments may involve determining the quantity of distinct classes in each segment. For example, if the training data set is clustered using a clustering algorithm, the class segmentation component can determine the quantity of representative data entities in each segment.

At decision block 212, the class segmentation component can determine whether the segments satisfy one or more segmentation criteria. A segmentation criterion may relate to the size of the segments, as determined in block 208. In some embodiments, a segmentation criterion may relate to a maximum size of the segments, a minimum size of the segments, or a range bounded by a maximum and minimum size. For example, if all segments have fewer than the maximum number of representative data entities and therefore classes, the process 200 may terminate at block 214. Otherwise, if the one or more segmentation criteria are not satisfied, the process 200 may return to block 206 for selection of a different set of segmentation candidate features.

In instances where the process 200 returns to block 206, the different set of segmentation candidate features may replace those of the prior iteration (e.g., the previously-generated segments may be discarded).

Alternatively, the different set of segmentation candidate features may be used to further refine the previously-generated segments. For example, if segmenting classes is implemented using a tree structure 120 as shown in FIG. 1, then an additional segmentation candidate feature or set of segmentation candidate features may be used to make additional branching decisions, add a new layer of nodes in a tree structure 102, etc. One benefit of implementing class segmentation using a tree 120 is the ease with which a segment can be identified for a new data entity during validation testing or at run time in production. For example, the features used to make each branching decision can be retained within the tree 120, and corresponding features of the data entity can be evaluated at each tier until arriving at a leaf node 126.

Example Process for Training Segment-Specific Classifiers

FIG. 3 illustrates an example process 300 that the classifier training component 104 may use to train classification models for individual class segments.

Figure 4:
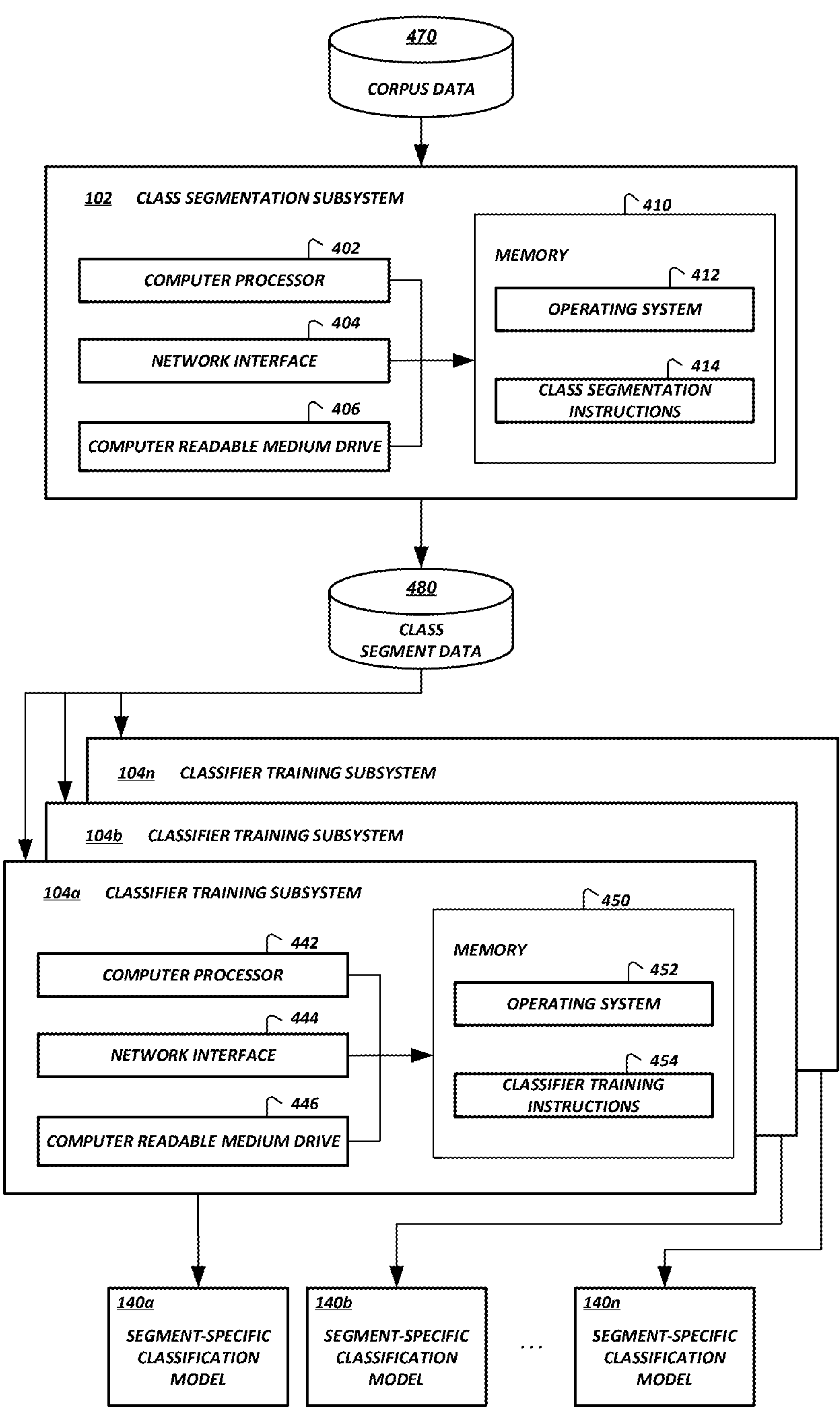
FIG. 4 is a block diagram illustrating various data flows and interactions between computing devices during training of machine learning models for individual class segments according to some embodiments.

The process 300 begins at block 302. The process 300 may begin in response to an event, such as when the class segmentation component 102 generates a set of class segments, when the classifier training component 104 begins operation, or in response to some other event. When the process 300 is initiated, a set of executable program instructions stored on one or more non-transitory computer-readable media (e.g., hard drive, flash memory, removable media, etc.) may be loaded into memory (e.g., random access memory or "RAM") of a computing device, such as a classifier training component 104 shown in FIG. 4 and described in greater detail below. In some embodiments, the process 300 or portions thereof may be implemented on multiple processors, serially or in parallel, as shown in FIG. 4 and described in greater detail below.

At block 304, the classifier training component 104 can obtain a set of class segments for which classifiers are to be trained. In some embodiments, the set of class segments may be obtained from the class segmentation component 102. For example, the output of process 200 may be data representing the segmentation of the set of classes into segments, such as table of mappings of classes to segments, a tree structure, or the like.

At block 306, the classifier training component 104 can obtain a training set of data entities for use in training the classifiers. In some embodiments, the training set of data entities may be selected from the corpus 110, and may include a constant number of data entities for each of the segment-specific classifiers to be trained. In some embodiments, the training set of data entities may be selected from the corpus 110 and may include a variable number of data entities for each of the segment-specific classifiers to be trained.

At block 308, the classifier training component 104 can train a machine-learning-based classification model—also referred to herein as a classification model, classifier, or model—for a specific segment of classes. In the description that follows, the classification model being trained during the current iteration of the process 300 will be referred to as the current classification model or current model, and segment of classes for which the current classification model is being trained will be referred to as the current segment.

Generally described, in some embodiments the classification model may be a machine learning model configured to produce the conditional probability:

$$P(G \mid f_1, f_2, \ldots, f_n) \tag{3}$$

where a data entity to be classified has n features $f_1, f_2, \ldots, f_n$, and the probability to be determined is that the data entity is a member of class G.

In one specific non-limiting embodiment, the classification model may be a naïve Bayes model. Using Bayes theorem, equation (3) can be re-written as:

$$P(G \mid f_1, f_2, \ldots, f_n) = \frac{P(G)P(f_1, f_2, \ldots, f_n \mid G)}{P(f_1, f_2, \ldots, f_n)} \tag{4}$$

where P(G) is the prior, $P(f_1, f_2, \ldots, f_n|G)$ is the likelihood, $P(f_1, f_2, \ldots, f_n)$ is the evidence, and $P(f_1, f_2, \ldots, f_n|G)$ is the posterior probability. Equation (4) can also be expressed as:

$$P(G \mid f_1, f_2, \ldots, f_n) = \frac{P(G)P(f_1 \mid G)P(f_2 \mid G) \ldots P(f_n \mid G)}{P(f_1)P(f_2) \ldots P(f_n)} \tag{5}$$

Because the denominator in equation (5) does not change between each evaluation, equation (5) can be expressed as:

$$P(G \mid f_1, f_2, \ldots, f_n) \propto P(G)P(f_1 \mid G)P(f_2 \mid G) \ldots P(f_n \mid G) = P(G)\prod_{i=1}^{n} P(f_i \mid G) \tag{6}$$

Equation (6) is a naïve Bayes probability model with the assumption that features are independent of each other. To use the naïve Bayes probability model as a classification model, the rule of maximum a posteriori ("MAP") estimation can be applied to identify the class G among m number of classes $G_1, G_2, \ldots, G_m$:

$$G = \underset{j \in (1,2,\ldots,m)}{\operatorname{argmax}}\, P(G_j)\prod_{i=1}^{n} P(f_i \mid G_j) \tag{7}$$

In another specific non-limiting embodiment, the classification model may be a decision-tree based model, such as a random forest classifier. A random forest classifier is a machine learning-based classification algorithm that can be used to efficiently and accurately classify a moderately large number of classes (e.g., up to 2,000 classes).

In another specific non-limiting embodiment, the classification model may be a Bayesian network. Bayesian networks are based on conditional probability and allow efficient probability inference at scale.

The example machine learning algorithms and models described herein for classification within individual segments are illustrative only, and are not intended to be limiting, required, or exhaustive. In some embodiments, other machine learning algorithms and models may be used.

At decision block 310, the classifier training component 104 can determine whether a stopping criterion has been satisfied for training of the current model. The stopping criterion (or multiple stopping criteria) may relate to the accuracy achieved in validation testing of the current model, the time spent training the current model, or some other metric. For example, metrics such as precision, recall, F1 score, and area under a receiver operating characteristic ("ROC") curve can be used. Other metrics may relate to the speed and memory requirements of the trained models, such as when the models are to be used in real-time analytics systems.

If the stopping criterion has been satisfied, the process 300 can proceed to decision block 312. Otherwise, if the stopping criterion has not been satisfied, the process 300 can return to block 308 for further training of the current model.

At decision block 312, the classifier training component 104 may determine whether additional models are to be trained for additional segments. If so, the process 300 may return to block 306. Otherwise, if no additional models are to be trained, the process 300 may proceed to block 314.

In some embodiments, multiple classification models may be trained in parallel or otherwise asynchronously. In some embodiments, the classification model for each class segment is the same type of classification model (e.g., random forest classifier) and is configured to consider the same set of features of data entities in making classification determinations. In some embodiments, the classification model for one class segment may be a different type of classification model than for another class segment. For example, the classification model for one class segment may be a random forest classifier, while the classification model for another may be a naïve Bayes model. In some embodiments, the classification model for one class segment may consider a first subset of features, while another classification model may consider a different subset of features. For example, the classification model for one class segment may consider features 1, 2, and 4 of a data entity, while the classification model for another class segment may consider features 1, 3, and 5.

At block 314, the classification system 100 may deploy the trained classifiers for use. The process 300 may then terminate at block 316.

Distributed Training Architecture

FIG. 4 shows aa distributed architecture in which multiple classifier training components can be used to train segment-specific machine-learning-based classification models in parallel or otherwise asynchronously. For example, multiple classifier training components 104$a$, 104$b$, . . . , 104$n$ can each separately train individual classification models, or subsets thereof, based on class segments determined by the class segmentation component 102.

As shown in FIG. 4, the classification segmentation component 102 and classifier training components 104$a$, 104$b$, . . . , 104$n$ can be computing systems with various components to implement their respective functionality.

In some embodiments, as shown, the class segmentation component 102 may include: one or more computer processors 402, such as physical central processing units ("CPUs"); one or more network interfaces 404, such as network interface cards ("NICs"); one or more computer readable medium drives 406, such as a high density disk ("HDD"), solid state drive ("SSD"), flash drive, and/or other persistent non-transitory computer-readable media; and one or more computer readable memories 410, such as random access memory ("RAM") and/or other volatile non-transitory computer-readable media. The computer readable memory 410 may include computer program instructions that one or more computer processors 402 execute in order to implement one or more embodiments. The computer readable memory 410 can store an operating system 412 that provides computer program instructions for use by the computer processor(s) 402 in the general administration and operation of the class segmentation component 102. In some embodiments, the computer readable memory 410 can further include computer program instructions and other information for implementing aspects of the present disclosure. For example, in one embodiment, the computer-readable memory 410 may include class segmentation instructions 414 for performing the operations of process 200 described above.

In some embodiments, as shown, the classifier training components 104*a*, 104*b*, . . . , 104*n* may include: one or more computer processors 442, such as physical CPUs; one or more network interfaces 444, such as NICs; one or more computer readable medium drives 446, such as HDDs, SSDs, flash drives, and/or other persistent non-transitory computer-readable media; and one or more computer readable memories 450, such as RAM and/or other volatile non-transitory computer-readable media. The computer readable memory 450 may include computer program instructions that one or more computer processors 442 execute in order to implement one or more embodiments. The computer readable memory 450 can store an operating system 452 that provides computer program instructions for use by the computer processor(s) 442 in the general administration and operation of a classifier training component 104. In some embodiments, the computer readable memory 450 can further include computer program instructions and other information for implementing aspects of the present disclosure. For example, in one embodiment, the computer-readable memory 450 may include classifier training instructions 454 for performing the operations of process 300 described above.

The class segmentation component 102 may obtain a corpus 110 of data from a data store 470. The class segmentation component 102 may generate class segments as described in greater detail above. The output of the class segmentation generation process may be class segment data 480. In some embodiments, the class segment data 480 may represent a mapping of classes to segments, such as the tree structure 120 shown in FIG. 1, a hash table, or the like.

Once the class segment data 480 has been generated, a fleet of classifier training components 104*a*, 104*b*, . . . , 104*n* may be employed to generate classification models for individual class segments. The classifier training components 104*a*, 104*b*, . . . , 104*n* may each generate a single classification model 140*a*, 140*b*, . . . , 140*n*, respectively, for a corresponding single class segment. In some embodiments, some or all of the classifier training components 104*a*, 104*b*, . . . , 104*n* may generate multiple segment-specific classification models. For example, a classifier training component 104*a* may be assigned a particular subset of segment-specific classifiers to train. As another example, the classifier training component 104*a* may train a segment-specific classifier and, upon completion, obtain or be assigned another segment-specific classifier to train.

The result of segment-specific classifier training may be a collection of segment-specific classifiers 140*a*, 140*b*, . . . , 140*n*, where n is the quantity of class segments. To organize the classifiers, a data structure such as a dictionary or hash table may be used to map the class segments to segment-specific classifiers 140*a*, 140*b*, . . . , 140*n*.

In some cases, a segment of classes may include only 1 class. Thus, instead of training a classifier to classify data entities, a mapping of the segment to the class may be used. For example, in the data structure that maps segments to classification models, the segment with 1 class may be mapped to the specific class.

Classification

Figure 5:
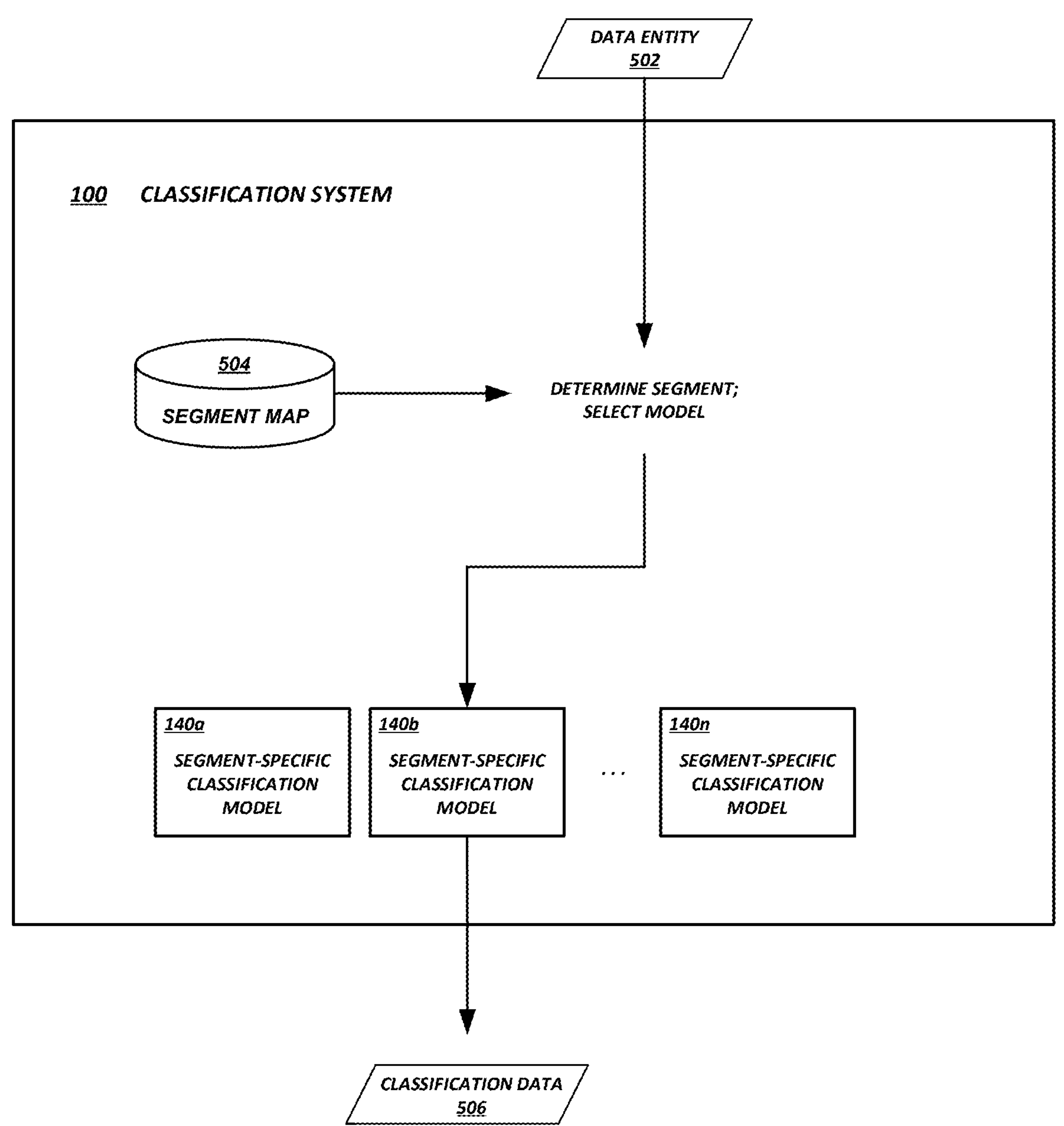
FIG. 5 is a block diagram illustrating various data flows and interactions between components of a data classification system according to some embodiments.

FIG. 5 shows data flows and interactions of a classification system 100 during use of segmentation data and segment-specific classifiers to classify a data entity within one of a large set of classes.

As shown, a data entity 502 may be provided to the classification system 100 for classification. The classification system 100 may first determine the class segment, of the multiple segments of classes, that likely includes the class into which the data entity 502 is to be classified. For example, the classification system 100 may use a segment map 504. The segment map may include data from which the proper segment for the data entity may be determined.

In some embodiments, the map 504 may represent a tree structure 120 that can be traversed based on features of the data entity 502 to determine the class segment. In other embodiments, the map 504 may represent a hash table that maps data entities to class segments and corresponding classification models. For example, the class segments may be determined using only a single feature, or a uniform combination of features across the entire set of classes. Thus, a multi-level tree may not be needed but instead a flat data structure that maps data entities to classifications may be used.

The classification system 100 may obtain the classification model 140*b* for the class segment to which the data entity likely belongs, and evaluate the classification model to assign a class to the data entity 502. The assigned class may be returned as output data 506.

In one specific, non-limiting embodiment, the data entities may represent network content browsing sessions of users. For example, the features of a session data entity may include a device type identifier, an operating system identifier, a browser identifier, an IP address, a timestamp, and other information associated with an individual browsing session. In this example, the classes that the classification system 100 is to determine for the data entities may be the individual users, where each user is a distinct class and the set of all classes to be segmented corresponds to the set of all users. The classification system 100 may implement the features and execute the processes described herein to predict a user from the set of all users when presented with a new browse session data entity.

In another specific, non-limiting embodiment, the data entities may represent documents, such as web pages or other network content items. For example, the features of a document data entity may include words of the document, a subject of the document, a source of the document, a timestamp of the document, and other information associated with an individual document. In this example, the classes that the classification system 100 is to determine for the data entities may be the individual documents, where each document is a distinct class and the set of all classes to be segmented corresponds to the set of all documents. The classification system 100 may implement the features and execute the processes described herein to predict, for a search request (e.g., a keyword in the context of a browsing session), a particular document that is being searched or requested from the set of all documents.

In another specific, non-limiting embodiment, the data entities may represent products or other items, such as products for sale in a digital marketplace. For example, the features of a product data entity may include words in a title or description of the product, a type of the product, a size of the product, a vendor of the product, and other information associated with an individual product. In this example, the classes that the classification system 100 is to determine for the data entities may be the individual products, where each product is a distinct class and the set of all classes to be segmented corresponds to the set of all products. The classification system 100 may implement the features and execute the processes described herein to predict, for a product search request (e.g., a keyword in the context of a product browsing session), a particular product that is being searched or requested from the set of all documents. As another example, the classification system 100 may predict a particular product to recommend to a user.

In another specific, non-limiting embodiment, the data entities may represent images, such images of users. In this example, the classes that the classification system 100 is to determine for the data entities may be the individual images, where each image is a distinct class and the set of all classes to be segmented corresponds to the set of all images.

In another specific, non-limiting embodiment, the data entities may represent words, such words spoken in utterances by users. In this example, the classes that the classification system 100 is to determine for the data entities may be the individual words, where each word is a distinct class and the set of all classes to be segmented corresponds to the set of all words in a language.

The example implementations described herein are illustrative only, and are not intended to be limiting, required, or exhaustive.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

under control of a computing system comprising one or more computing devices configured to execute specific instructions, obtaining a plurality of data entities, wherein a data entity of the plurality of data entities comprises a set of values for a set of features;

determining a degree of intra-class variability in values for a feature of the set of features among only data entities labeled with a class of a set of classes, wherein the set of classes comprises at least one hundred thousand classes;

identifying, prior to segmenting the set of classes and based on the degree of intra-class variability being below a predetermined threshold, the feature as a segmentation candidate feature to segment the set of classes;

segmenting the set of classes into a plurality of class segments based at least partly on the segmentation candidate feature, wherein each class segment of the plurality of class segments comprises at least two orders of magnitude fewer classes than the set of classes, and wherein each class segment is associated with a different data entity subset of the plurality of data entities; and training a plurality of machine-learning-based classification models comprising a separate machine learning based classification model for each class segment of the plurality of class segments, wherein a first machine-learning-based classification model is trained for a first class segment of the plurality of class segments using a first data entity subset associated with the first class segment, and wherein a second machine-learning-based classification model is trained for a second class segment of the plurality of class segments using a second data entity subset associated with the second class segment.

2. The computer-implemented method of claim 1, further comprising identifying a second segmentation candidate feature to segment the set of classes, wherein segmenting the set of classes into to the plurality of class segments is based at least partly on the segmentation candidate feature and the second segmentation candidate feature.

3. The computer-implemented method of claim 1, further comprising:

identifying a second segmentation candidate feature to segment the set of classes;

segmenting the set of classes into to a second plurality of class segments based at least partly on the second segmentation candidate feature; and determining that the second plurality of class segments fails to satisfy a segmentation criterion, wherein segmenting the set of classes into the plurality of class segments based at least partly on the segmentation candidate feature is performed in response to determining that the second plurality of class segments fails to satisfy the segmentation criterion.

4. The computer-implemented method of claim 1, wherein segmenting the set of classes into the plurality of class segments comprises generating a tree data structure, wherein a first leaf node of the tree data structure is associated with a first class segment, and wherein a second leaf node of the tree data structure is associated with a second class segment.

5. The computer-implemented method of claim 1, wherein segmenting the set of classes into the plurality of class segments comprises executing a clustering algorithm using the segmentation candidate feature and a different representative data entity of each class of the set of classes.

6. The computer-implemented method of claim 1, wherein training the plurality of machine-learning-based classification models comprises training at least one of: a naïve Bayes classifier, a random forest model, or a Bayes network.

7. The computer-implemented method of claim 1, wherein training the plurality of machine-learning-based classification models comprises:

training the first machine-learning-based classification model using a first computing device of a plurality of computing devices; and training the second machine-learning-based classification model using a second computing device of the plurality of computing devices, wherein at least a portion of training the second machine-learning-based classification model is performed in parallel with at least a portion of training the first machine-learning-based classification model.

8. The computer-implemented method of claim 1, further comprising generating a table comprising:

first data associating a first class segment with the first machine-learning-based classification model trained to generate classification output data associated with one or more classes of the first class segment; and second data associating a second class segment with the second machine-learning-based classification model trained to generate classification output data associated with one or more classes of the second class segment.

9. The computer-implemented method of claim 8, further comprising:

receiving a data entity to be classified;

determining that the data entity is associated with the first class segment;

determining, using the table, to classify the data entity using the first machine-learning-based classification model; and classifying the data entity using the first machine-learning-based classification model.

10. The computer-implemented method of claim 8, wherein generating the table further comprises generating third data associating a third class segment with a single class, wherein the third class segment comprises only the single class.

11. The computer-implemented method of claim 1, wherein segmenting the set of classes into the plurality of class segments comprises generating a graph data structure, wherein a first vertex of the graph data structure is associated with a first class segment, and wherein a second vertex of the graph data structure is associated with a second class segment.

12. A system comprising:

computer-readable memory storing executable instructions; and one or more computer processors in communication with the computer-readable memory and programmed by the executable instructions to at least:

obtain a plurality of data entities, wherein a data entity of the plurality of data entities comprises a set of values for a set of features;

determine a degree of intra-class variability in values for a feature of the set of features among only data entities labeled with a class of a set of classes, wherein the set of classes comprises at least one hundred thousand classes;

identify, prior to segmenting the set of classes and based on the degree of intra-class variability being below a predetermined threshold, the feature as a segmentation candidate feature to segment the set of classes;

segment the set of classes into a plurality of class segments based at least partly on the segmentation candidate feature, wherein each class segment of the plurality of class segments comprises at least two orders of magnitude fewer classes than the set of classes, and wherein each class segment is associated with a different data entity subset of the plurality of data entities; and train a plurality of machine-learning-based classification models comprising a separate machine learning based classification model for each class segment of the plurality of class segments, wherein a first machine-learning-based classification model is trained for a first class segment of the plurality of class segments using a first data entity subset associated with the first class segment, and wherein a second machine-learning-based classification model is trained for a second class segment of the plurality of class segments using a second data entity subset associated with the second class segment.

13. The system of claim 12, wherein the one or more computer processors are programmed by further executable instructions to determine a degree of variability in values for the segmentation candidate feature among data entities associated with a particular class of the set of classes, wherein the segmentation candidate feature is identified based on the degree of variability.

14. The system of claim 12, wherein the one or more computer processors are programmed by further executable instructions to:

receive a data entity to be classified;

determine, using one of a graph data structure or a tree data structure, that the data entity is associated with a first class segment; and classify the data entity using a first machine-learning-based classification model trained to classify data entities as one or more classes of the first class segment.

15. The system of claim 12, wherein the first machine-learning-based classification model is trained using a first processor, and wherein the second machine-learning-based classification model is trained using a second processor.

16. The system of claim 15, wherein at least a portion of training the second machine-learning-based classification model is performed in parallel with at least a portion of training the first machine-learning-based classification model.

17. The system of claim 12, wherein the first machine-learning-based classification model is trained to consider a first subset of the set of features, wherein the second machine-learning-based classification model is trained to consider a second subset of the set of features, and wherein the second subset is different from the first subset.

18. The system of claim 12, wherein to segment the set of classes into the plurality of class segments, the one or more computer processors are programmed by further executable instructions to generate a tree data structure, wherein a first leaf node of the tree data structure is associated with a first class segment, and wherein a second leaf node of the tree data structure is associated with a second class segment.

19. The system of claim 12, wherein to segment the set of classes into the plurality of class segments, the one or more computer processors are programmed by further executable instructions to generate a graph data structure, wherein a first vertex of the graph data structure is associated with a first class segment, and wherein a second vertex of the graph data structure is associated with a second class segment.

20. The system of claim 12, wherein the set of classes comprises 1,000,000 distinct classes.

* * * * *